UNITED STATES PATENT OFFICE.

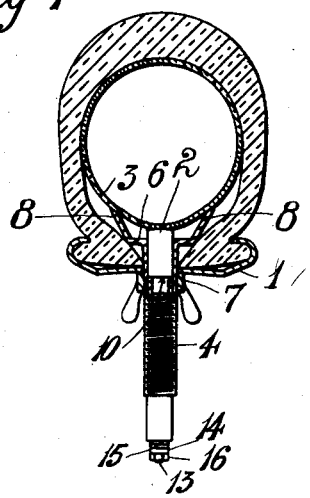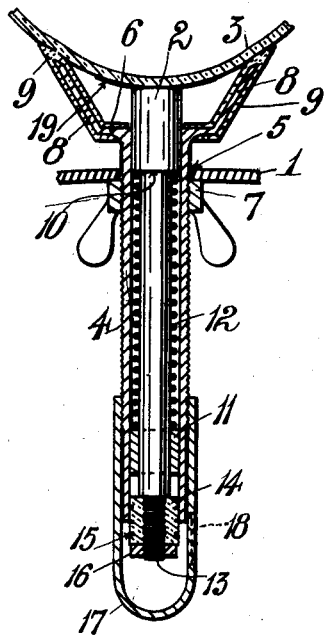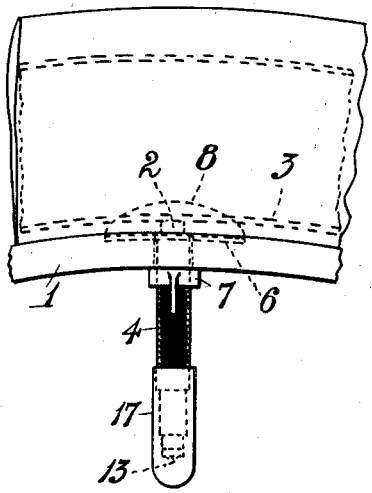

FRANK OSBORNE WOLFF, OF WINDSOR, NEAR MELBOURNE, VICTORIA, AUSTRALIA, ASSIGNOR OF ONE-HALF TO JOHN KEARNS, OF PRAHRAN, AUSTRALIA.

PRESSURE-INDICATOR FOR PNEUMATIC TIRES.

No. 905,778.   Specification of Letters Patent.   Patented Dec. 1, 1908.

Application filed July 11, 1907. Serial No. 383,278.

*To all whom it may concern:*

Be it known that I, FRANK OSBORNE WOLFF, a subject of the King of Great Britain, residing at 25 Raleigh street, Windsor, near Melbourne, in the State of Victoria, Australia, rubber worker, have invented an Improved Pressure-Indicator for Pneumatic Tires, of which the following is a specification.

It is highly desirable that there should be as far as possible equality of pressure in pneumatic tires for motor-cars and like vehicles in order to minimize the wear.

Heretofore the pressure in pneumatic tires has been temporarily indicated by a spring pressure recorder which was removably attached to the valve of the tire and when fixed was placed in direct communication with the air pressure therein.

Now this invention has been devised to provide an indicator which is permanently affixed to the rim and shows the internal pressure continuously by means of the external circumferential pressure of the inner tube.

The drawings illustrating the invention comprise;—Figure 1 a transverse section through the tire and rim of a motor wheel (partly in elevation) showing the indicator fixed in position with its cap removed. Fig. 2 a side elevation of parts shown in Fig. 1, and Fig. 3 an enlarged vertical section through the indicator.

According to this invention a spring piston is passed radially through the rim 1 of the vehicle wheel in such a manner that the operative end 2 presses against the exterior of the inner inflatable tube 3. Said piston is fitted within a hollow casing 4 which projects through a hole 5 in the rim, and is fastened thereto by means of its head 6 and a wing nut 7. Said casing may constitute one of the usual securing bolts of the wheel in which case the operative end 2 of the piston is situate between the flanges 8 on its head, which latter may have a rubber coating 9.

The piston is provided with an external shoulder 10 and the casing with an inner shoulder 11, and the spiral spring 12 which is wound around said piston abuts at its respective ends against said shoulders and exerts an outward radial pressure on the piston.

The inner end 13 of the piston is screw threaded and is provided with an adjustable sleeve or nut 14 marked on its circumference with graduations or indicator marks 15. Said sleeve is secured upon the piston by means of a lock nut 16 and besides indicating the pressure acts in a subsidiary way as a limiting stop for the piston by abutting against the shoulder of the casing when the pneumatic pressure is released. It will be apparent that this sleeve might be dispensed with when the graduations would be marked directly upon the piston.

The graduations or markings are made in accordance with the strength of the spiral spring, and the pressure exerted upon the operative end of the piston by the inner tube is indicated according to the extent to which the graduated end of said piston is projected through the end of its casing.

The inner graduated end of the piston may be protected by a cap 17 screwed upon the casing, and said cap may be made of transparent material such as mica, or a small sight hole may be formed in a metal cap and covered by some transparent material as indicated by dotted lines 18 (Fig. 3).

In order to protect the inner tube at the spot where the operative end of the piston abuts, an external piece of fabric or the like 19 may be secured to said tube.

Having now particularly described and ascertained the nature of my said invention and in what manner the same is to be performed, I declare that what I claim is;—

1. In a pressure indicator for pneumatic tires, the combination of an inflatable tube, a pressure indicating element, a spring to control the latter, and means coöperating with the element to cause the spring to hold one end of said element against the inflatable tube.

2. In a pressure indicator for pneumatic tires, the combination of an inner inflatable tube, a spring controlled radially disposed element bearing at one end against said tube and indicating means at the other end of the radially disposed element.

3. In a pressure indicator for pneumatic tires, the combination of an inflatable tube, a piston having graduations at one end, and means to hold the other end of said piston against the inflatable tube.

4. In a pressure indicator for pneumatic tires, the combination with a wheel rim, of an inflatable tube mounted thereon, a casing carried by the rim, and a piston in the casing having graduations at one end and its other end in contact with the tube.

5. In a pressure indicator for pneumatic tires, the combination with a wheel rim and an inflatable tube mounted thereon, of a casing open at both ends mounted in the rim, a piston mounted in the casing extending through the latter having one end in contact with the tube and a sleeve having graduations thereon adjustably mounted on the other end of the piston.

6. In a pressure indicator for pneumatic tires, the combination with a wheel rim and an inflatable tube mounted thereon, of a casing open at both ends mounted in the rim and having an internal shoulder, a piston mounted in the casing extending through the latter and having a shoulder formed near one end, a spiral spring surrounding the piston abutting against said shoulders, and a sleeve having graduations thereon adjustably mounted on the piston below the internal shoulder.

In testimony whereof I have hereunto set my hand in presence of two subscribing witnesses.

FRANK OSBORNE WOLFF.

Witnesses:
EDWARD NEEDHAM WATERS,
PERCY JOHNSTON.